United States Patent [19]
Ngo et al.

[11] Patent Number: 5,954,469
[45] Date of Patent: Sep. 21, 1999

[54] EXTRACTION BAR MECHANISM FOR STORAGE PHOSPHOR READER

[75] Inventors: Giang T. Ngo, Hilton; Vincent B. Dethier, Rochester, both of N.Y.

[73] Assignee: Eastman Kodak Company, Rochester, N.Y.

[21] Appl. No.: 09/038,319

[22] Filed: Mar. 11, 1998

Related U.S. Application Data

[63] Continuation of application No. 08/935,706, Sep. 23, 1997.

[51] Int. Cl.$^6$ .................................................. B65G 65/00
[52] U.S. Cl. ............................................................. 414/416
[58] Field of Search .................................. 414/411, 416; 53/284.4, 381.4; 250/589, 590

[56] References Cited

U.S. PATENT DOCUMENTS

| | | | |
|---|---|---|---|
| 3,111,585 | 11/1963 | Sano et al. .............................. | 414/411 |
| 4,354,336 | 10/1982 | Azzaroni ............................. | 414/411 X |
| 4,775,138 | 10/1988 | Müller ................................. | 414/411 X |
| 4,778,810 | 10/1988 | Bauer et al. ........................ | 414/411 X |
| 5,277,322 | 1/1994 | Boutet et al. ........................... | 414/411 |
| 5,330,309 | 7/1994 | Brahm et al. .............................. | 211/41 |

*Primary Examiner*—David A. Bucci
*Attorney, Agent, or Firm*—William F. Noval

[57] ABSTRACT

In a storage phosphor reader having a receiving station for receiving a cassette containing a removable storage phosphor, the storage phosphor having an end cap with an alignment opening and access openings, an extraction bar assembly comprising: an extraction bar; a locator pin and spaced hook members projecting from the extraction bar toward a received cassette; a slider for mounting the locating pin, the slider being slidably mounted on the extraction bar; an over center spring connected between the slider and the extraction bar; mechanism for moving the extraction bar towards a received storage phosphor so that the locator pin and hook members are respectively inserted into the alignment opening and the access openings of the storage phosphor end cap and then for moving the extraction bar laterally of the storage phosphor so that the hook members engage the end cap of the storage phosphor, the slider slides in the extraction bar, and the over center spring locks the hook members in the engaged position; and a wedge mechanism that is movably mounted on the extraction bar to engage the storage phosphor end cap when the hook members engage the end cap, the wedge member stabilizing the engagement.

3 Claims, 7 Drawing Sheets

5,954,469

EXTRACTION BAR MECHANISM FOR STORAGE PHOSPHOR READER

CROSS REFERENCE TO RELATED APPLICATIONS

This patent application claims the benefit under 35 USC § 120 of the earlier filing date of U.S. patent application Ser. No. 08/935,706, filed Sep. 23, 1997, inventor Giang T. Ngo.

FIELD OF THE INVENTION

This invention relates in general to storage phosphor readers and more particularly to an extraction bar mechanism for use in a storage phosphor reader to extract and replace a removable storage phosphor with respect to a storage phosphor cassette received by the reader.

BACKGROUND OF THE INVENTION

In a known storage phosphor reader, a cassette containing a storage phosphor is located at a cassette receiving station where the cassette is clamped to the reader. A storage phosphor extraction mechanism extracts the storage phosphor from the cassette and moves the storage phosphor onto a stage. The stage moves the storage phosphor past a laser scanning reading station where the latent radiographic image stored in the phosphor is converted to a radiographic image signal.

In order to successfully extract the storage phosphor, the reader must know where the cassette is located to properly position the extraction mechanism. Since there exist a number of different sized cassettes, it becomes critical to adjust for location of the extraction mechanism. Cassettes smaller than 35 cm×43 cm require a holding pallet to be successfully fed into the reader. This causes a dimensional difference in cassette location from a datum point.

An extraction mechanism used in such reader includes a hook bar assembly and a locating pin (See: U.S. Pat. No. 5,330,309, issued Jul. 19, 1994, inventors Brahm et al). The assembly is initially moved so that the locating pin contacts the front end of the storage phosphor. The assembly is then moved laterally of the cassette until the locating pin falls into a reference opening in the front end of the storage phosphor. The extractor assembly is then moved relative to the cassette to engage the hook bar assembly with the storage phosphor to unlatch the storage phosphor and to subsequently remove the storage phosphor from the cassette onto a stage. Although this extraction mechanism has been suitable for its intended purpose, it would be desirable to provide a simpler, more reliable, more efficient, and less costly extraction system.

SUMMARY OF THE INVENTION

According to the present invention there is provided an improvement over the apparatus described above. According to a feature of the present invention there is provided a storage phosphor reader having a receiving station for receiving a cassette containing a removable storage phosphor, the storage phosphor having an end cap with an alignment opening and access openings, an extraction bar assembly comprising: an extraction bar; a locator pin and spaced hook members projecting from the extraction bar toward a received cassette; a slider for mounting the locating pin, the slider being slidably mounted on the extraction bar; an over center spring connected between the slider and the extraction bar; means for moving the extraction bar towards a received storage phosphor so that the locator pin and hook members are respectively inserted into the alignment opening and the access openings of the storage phosphor end cap and then for moving the extraction bar laterally of the storage phosphor so that the hook members engage the end cap of the storage phosphor, the slider slides in the extraction bar, and the over center spring locks the hook members in the engaged position; and a wedge mechanism that is movably mounted on the extraction bar to engage the storage phosphor end cap when the hook members engage the end cap, the wedge member stabilizing the engagement.

ADVANTAGEOUS EFFECT OF THE INVENTION

The present invention has the following advantages.

1. It is robust, simple, reliable, and efficient.
2. It eliminates wear of pin and hooks caused by cassette engagement.
3. It eliminates pin switch and pin switch functions.

DETAILED DESCRIPTION OF THE INVENTION

Figure 1:
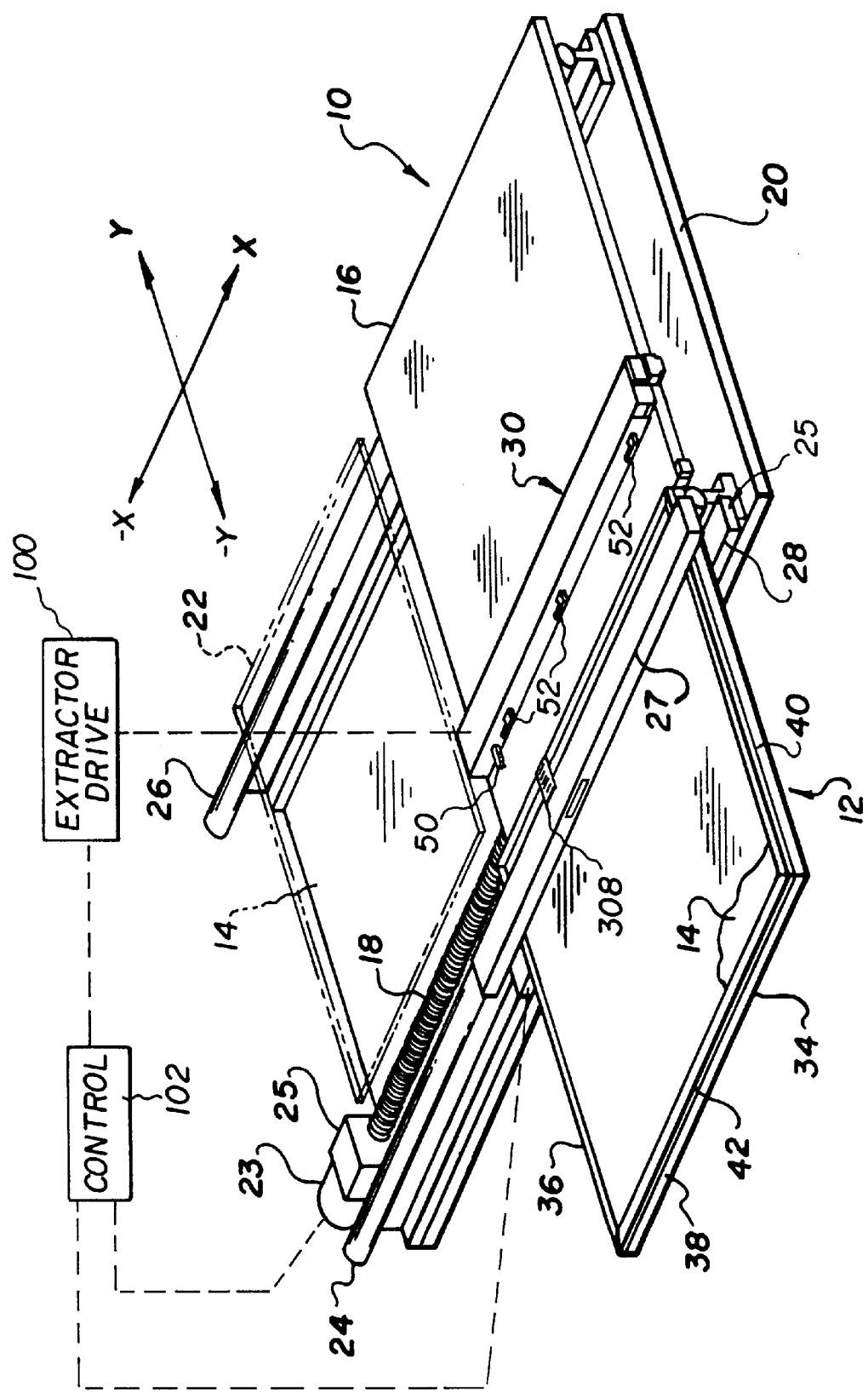
FIG. 1 is a perspective view of components of a storage phosphor reader incorporating the present invention.
Figure 2:
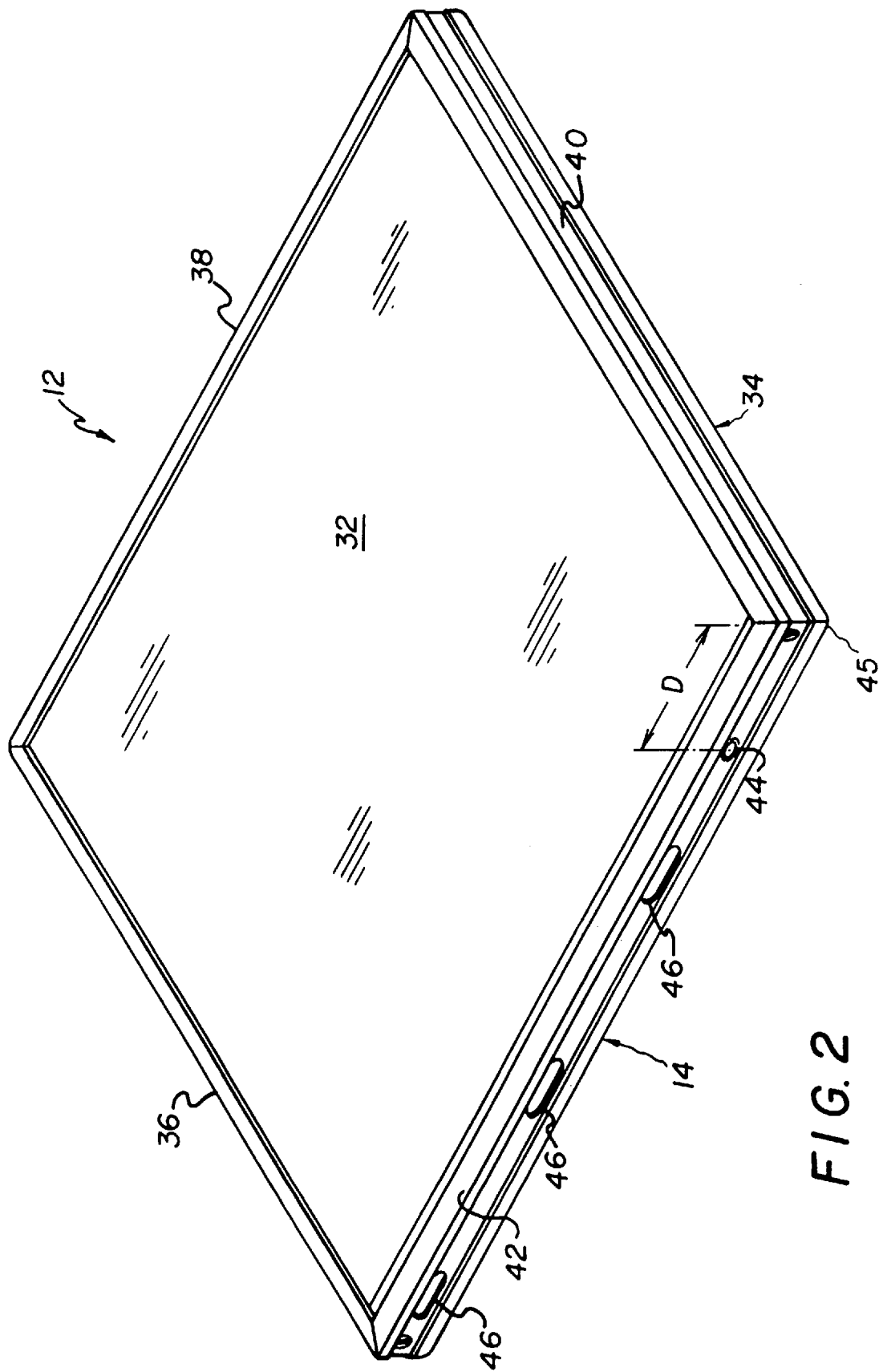
FIGS. 2 and 3 are perspective views of storage phosphor cassettes which can be read by reader 10.

Referring to FIGS. 1–2, there is illustrated a storage phosphor reader 10 including components for scanning a storage phosphor. In the particular embodiment illustrated, the reader 10 is designed to receive a cassette 12 having a storage phosphor 14 disposed therein. Storage phosphor 14 is capable of storing a latent image upon x-radiation of a body part. A digital image can be extracted for later viewing or development of a x-ray film by reading the latent x-ray image with a laser scanning reader. The reader is of the raster scanner-type. Briefly, when the image on the storage phosphor 14 is exposed to a stimulating ray beam, such as a laser beam, the storage phosphor 14 emits a light in proportion to a stored x-radiation energy. The light thus emitted is photoelectrically detected and converted to an electrical signal, and the radiation image of the object is reproduced visually by exposure of the image signal on a recording medium such as a photographic film or on a video monitor.

The stimulating of the storage phosphor by a laser beam is typically done using a raster scanning technique. The mechanism 10 includes a movable stage 16 which includes a drive screw 18 which is mounted to base 20 of the reader. The drive screw 18 is in threaded engagement with movable stage 16 so as to move the stage 16 from the receiving position illustrated in FIG. 1 to the scanned position 22 illustrated by dash lines also in FIG. 1. An appropriate stepper motor 23 and corresponding transmission 25 is provided for rotating the drive screw 18 such that the stage 16 can move in the X direction. The stage 16 is supported by a pair of guide rails 24,26 which are axially spaced apart and secured to the base 20. Guide rails 24,26 and drive screw 18 are in substantial parallel alignment with each other.

The reader includes a cassette clamping mechanism at cassette receiving station 25. The clamping mechanism includes an upper clamp jaw 27 and lower clamp jaw 28 which are used to clamp the cassette in a predetermined fixed position.

The mechanism 10 includes an extractor bar assembly 30 which is mounted to stage 16 for movement in the Y direction by extractor drive 100. The X and Y directions, as set forth in this application, have been provided merely for the sake of clarity in describing the direction of movement of various parts, it being understood that any coordinate system may be substituted as desired. In the particular embodiment, the extractor bar assembly 30 is designed for movement to and away from the cassette 12, while the stage 16 moves in a direction substantially transverse to the end/side of the cassette facing the extractor bar assembly 30. The cassette 12 is of the type designed for removing the storage phosphor from the end/side of the cassette. Briefly, as shown in FIG. 2, the cassette 12 comprises a shell having upper and lower panels 32,34, respectively, and three side caps 36,38,40. A storage phosphor 14 is disposed therein and is secured to a removable end cap 42. The end cap 42 includes a latching mechanism for releasing the end cap 42 from the cassette 12. Additionally, the end cap 42 includes an alignment opening 44, disposed preferably along one side of the cassette 12. The end cap 42 further includes a plurality of access openings 46 designed to receive hook members designed to engage the latching mechanism disposed within the cassette (not shown). The latching mechanism is of a construction such that when the hook mechanism is moved in a particular direction, it will release the end cap 42 from the cassette 12 allowing the end cap 42 and attached storage phosphor 14 to be removed therefrom.

Figure 3:
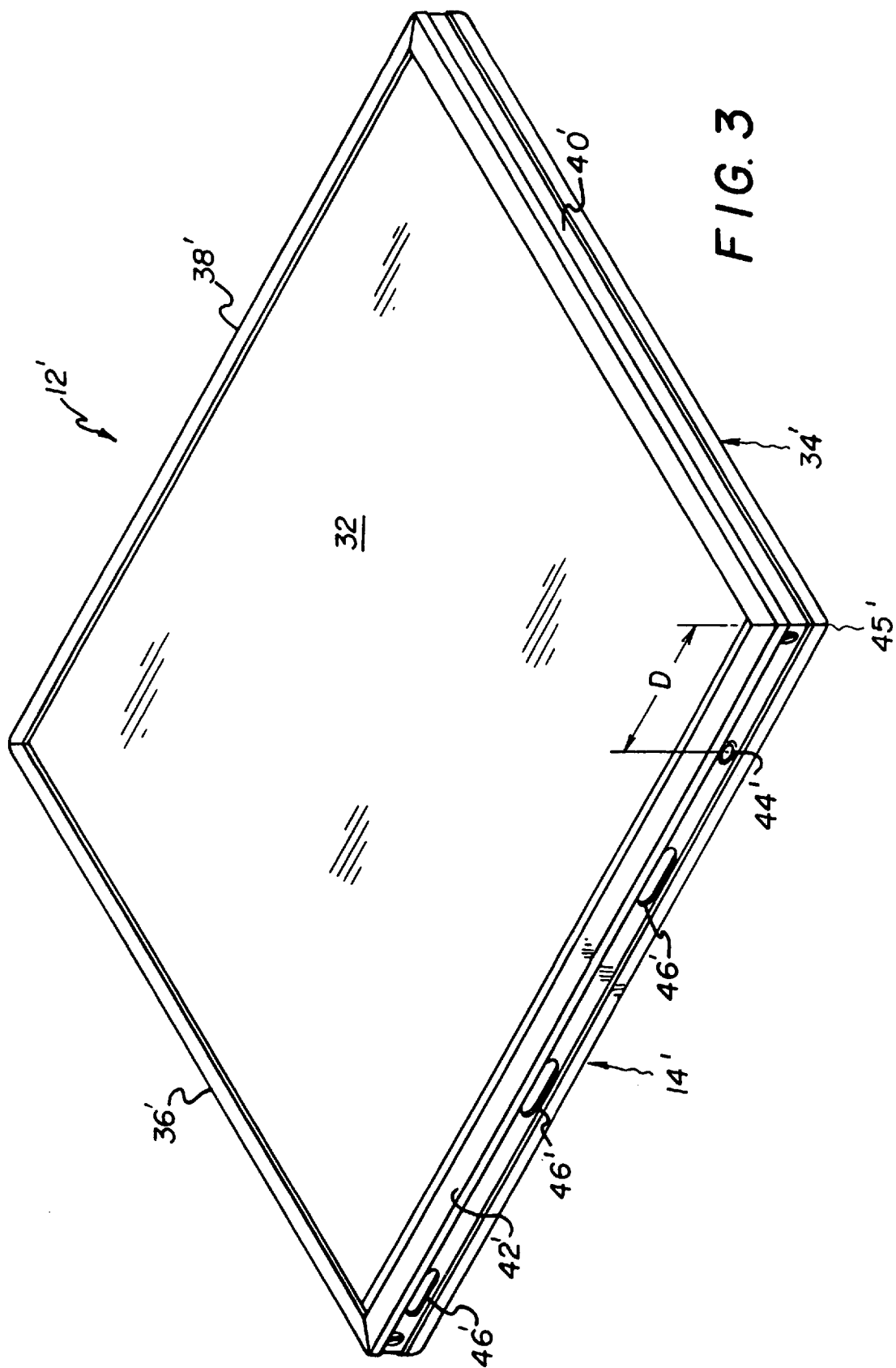

FIG. 3 shows a different sized cassette 12' having a shell with upper and lower panels 32',34', respectively, and three side caps 36',38',40'. Removable storage phosphor 14' is disposed therein and is secured to an end cap 42'. End cap 42' has alignment opening 44' and access openings 46'.

Cassette 12 contains a larger storage phosphor 14 than the storage phosphor 14' of cassette 12'. For example, storage phosphor 14 has the dimensions 35 cm×43 cm and storage phosphor 14' has the dimensions 20 cm×25 cm.

FIG. 3 shows a different sized cassette 12' having a shell with upper and lower panels 32',34', respectively, and three side caps 36',38',40'. Removable storage phosphor 14' is disposed therein and is secured to an end cap 42'. End cap 42' has alignment opening 44' and access openings 46'. Cassette 12' is preferably held in a pallet such as disclosed in U.S. Pat. No. 5,277,322 to facilitate handling of the cassette.

Cassette 12 contains a larger storage phosphor 14 than the storage phosphor 14' of cassette 12'. For example, storage phosphor 14 has the dimensions 35 cm×43 cm and storage phosphor 14' has the dimensions 20 cm×25 cm.

Figure 5:
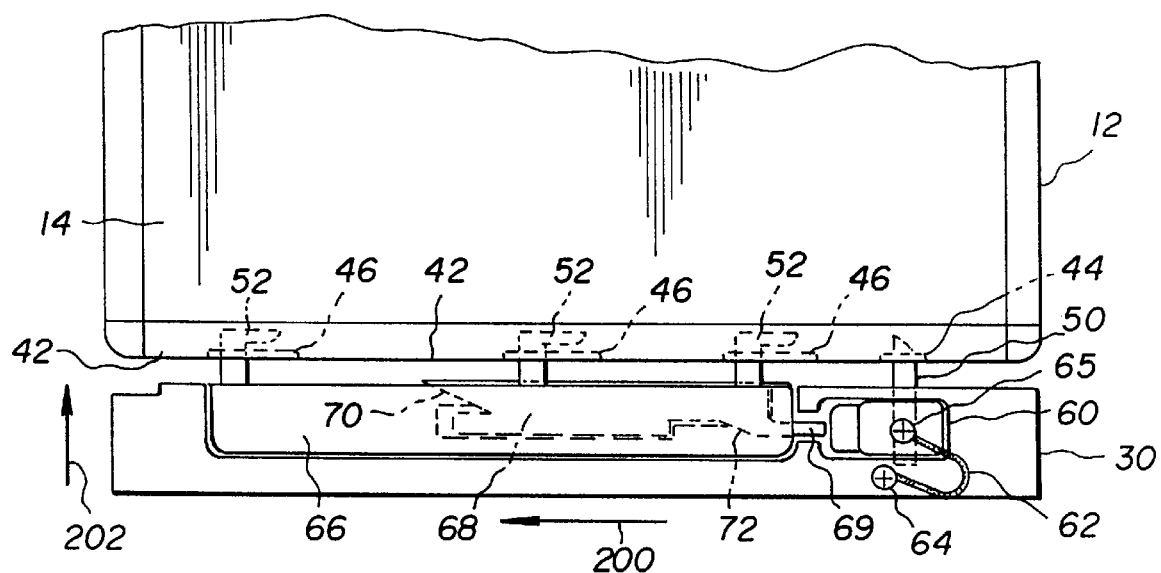
FIGS. 5 and 6 are diagrammatic plan views of a storage phosphor extraction mechanism according to the present invention.
Figure 6:
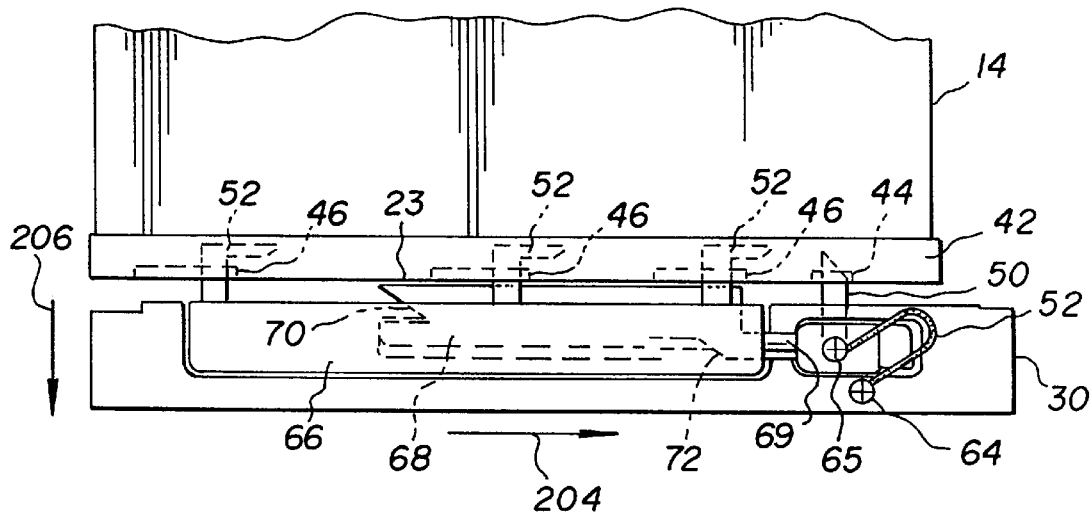

Referring now to FIGS. 5 and 6, there is shown in greater detail extractor bar assembly 30. As shown, extractor bar assembly 30 includes a locator pin 50 and hook members 52. Pin 50 is adapted to enter alignment opening 44 in storage phosphor 14 and hook members 52 are adapted to enter access openings 46 in storage phosphor 14. Pin 50 is fixedly mounted on slider 60. An over center spring 62 is connected by fastener 64 to assembly 30 and by fastener 65 to slider 60. Hook members 52 are mounted on hook plate 66. A wedge mechanism 68 includes a pin 69 which is engageable by slider 60.

Extractor bar assembly 30 mounted on stage 16 is driven in the direction of arrow 202 by extractor drive 100 (FIG. 1) on stage 16 and in the direction of arrow 200 by stage 16, motor 23 and transmission 25 to insert locator pin 50 into alignment opening 44 and hook members 52 into access openings 46. The direction of stage 16 is reversed to move assembly 30 in the direction of arrow 204 (FIG. 6). Slider 60 engages pin 69 which urges wedge mechanism 68 forward into contact with end cap 42 of storage phosphor 14 by means of camming surfaces 70,72. Over center spring 62 locks hook members 52 in engagement with storage phosphor 14. Extraction bar assembly 30 is then moved by drive 100 in the direction of arrow 206 to completely remove storage phosphor 14 from cassette 12.

This process is reversed to insert storage phosphor 14 back into cassette 12.

Wedge mechanism 68 holds end cap 42 rigid relative to storage phosphor 14 so that wear of pin 44, hooks 52, and end cap 42 is minimized during extraction and insertion of storage phosphor 14.

Figure 7:
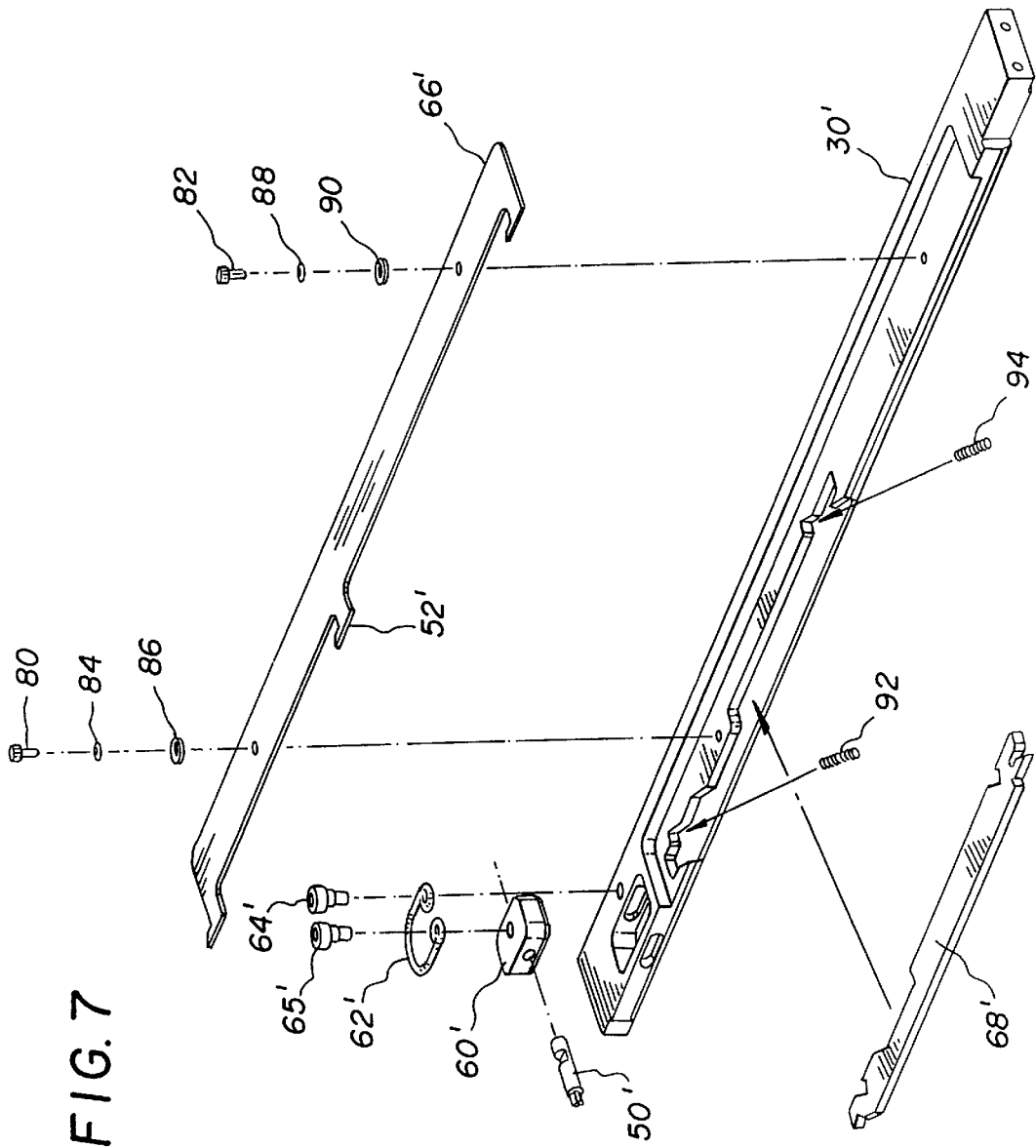
FIGS. 7 and 8 are respective exploded and plan views of another storage phosphor extraction mechanism.
Figure 8:
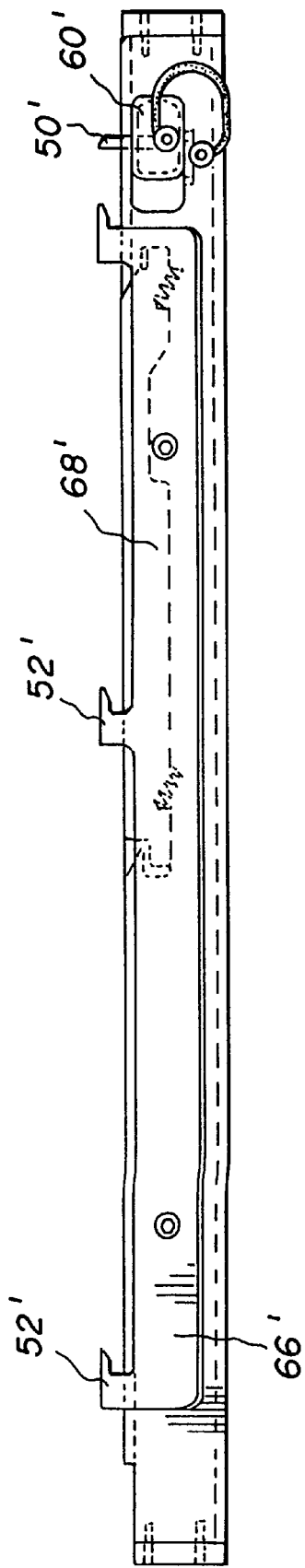

Referring now to FIGS. 7 and 8, there is shown another extractor bar assembly 30'. As shown, extractor bar assembly 30' includes a locator pin 50' and hook members 52'. Pin 50' is mounted on slider 60'. Over center spring 62' is connected by fastener 64' to assembly 30' and by fastener 65' to slider 60'. Hook members 52' are mounted on hook plate 66'. Hook plate 66' is mounted on assembly 30' by fasteners 80,82 with respective washers 84,86 and 88,90. A wedge mechanism 68' is slidably mounted between plate 66' and assembly 30'. Springs 92,92 normally bias wedge mechanism forwardly. Over center spring 62' operates in a manner similar to spring 60.

The extractor bar assembly 30' of FIGS. 7 and 8 differs from the extractor bar assembly 30 of FIGS. 5 and 6 in the mounting and operation of the respective wedge mechanism 68,68'. Wedge mechanism 68 is normally retracted and is extended only after locator pin 50 has entered alignment opening 44 in storage phosphor 14. When assembly 30 is moved to engage hook members 52 with end cap 42, slider 60 through pin 69, cams wedge mechanism 68 forward into contact with end cap 42. On the other hand, wedge mechanism 68' is normally urged forward to an extended position so that as pin 50' is moved into alignment opening 44, wedge mechanism 68' contacts end cap 42 and stays in contact with end cap 42 during the locking movement of hook members 52.

The distance D between alignment opening 44 in end cap 42 of storage phosphor 14 and reference corner 45 is greater than the distance D' between alignment opening 44' in end cap 42' of storage phosphor 14' and reference corner 45' (See: FIGS. 2 and 3). Thus, some technique must be used to align pin 50 of assembly 30 with opening 44 of storage phosphor 14 to avoid the disadvantages of the alignment mechanism of U.S. Pat. No 5,330,309.

Figure 4:
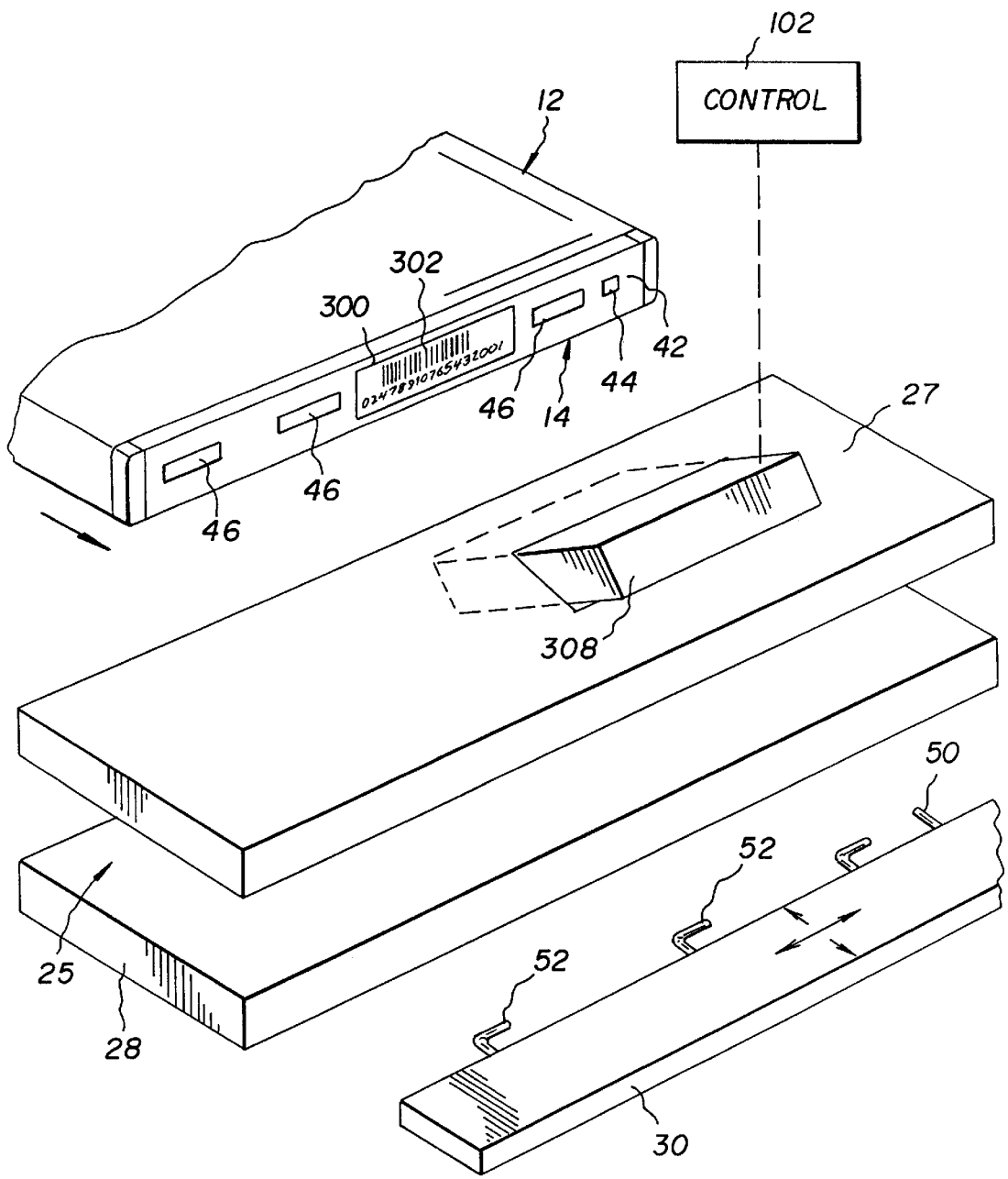
FIG. 4 is a diagrammatic view of a bar code system for locating the extraction mechanism.

As shown in FIG. 4, end cap 42 of storage phosphor 14 is provided with a bar code label 300. Label 300 includes a bar code 302 encoding various data including storage phosphor ID number, storage phosphor dimensional size (e.g., 35 cm×43 cm), and speed (of screen). Mounted on upper clamp jaw 27 is a bar code reader 308 of a known type. Before cassette 12 is clamped between clamp jaws 27,28 at cassette receiving station 25, bar code reader 308 reads the bar code 302 including storage phosphor dimensional size data. This data is transmitted to control 102 (such as a microprocessor system). Control 102 uses the storage phosphor dimensional data to control extractor drive 100 and stage drive motor 23 to position extraction bar assembly 30 so that pin 50 is exactly aligned with alignment opening 44 in end cap 42.

This bar code alignment system eliminates the pin switch system of U.S. Pat. No. 5,330,309, thus increasing reliability, minimizing reader down time, and eliminating damage to the cassette caused by the locating pin striking the cassette.

The invention has been described in detail with particular reference to certain preferred embodiments thereof, but it will be understood that variations and modifications can be effected within the spirit and scope of the invention.

PARTS LIST

10 storage phosphor reader
12,12' cassettes
14,14' storage phosphors
16 movable stage
18 drive screw
19 drive nut
20 base
21 element
22 scanned position
23 stepper motor
24,26 guide rails
25 cassette receiving station
27 clamp jaw
30 extractor bar assembly
32,32' upper panels
34,34' lower panels
36,36'38,38',40,40' side caps
42,42' removable end cap
44,44' alignment openings
45,45' reference corners
46,46' access openings
50 locator pin
52 hook members
60 slider
62 over center spring
64,65 fasteners
66 hook plate
68 wedge mechanism
70,72 camming surfaces
100 extractor drive
102 control
300 bar code label
302 barcode
308 bar code reader

What is claimed is:

1. In a storage phosphor reader having a receiving station for receiving a cassette containing a removable storage phosphor, the storage phosphor having an end cap with an alignment opening and access openings, an extraction bar assembly comprising:

an extraction bar;

a locator pin and spaced hook members projecting from said extraction bar toward a received cassette;

a slider for mounting said locating pin, said slider being slidably mounted on said extraction bar;

an over center spring connected between said slider and said extraction bar;

means for moving said extraction bar towards a received storage phosphor so that said locator pin and hook members are respectively inserted into said alignment opening and said access openings of said storage phosphor end cap and then for moving said extraction bar laterally of said storage phosphor so that said hook members engage said end cap of said storage phosphor, said slider slides in said extraction bar, and said over center spring locks said hook members in said engaged position; and a wedge mechanism that is movably mounted on said extraction bar to engage said storage phosphor end cap when said hook members engage said end cap, said wedge member stabilizing said engagement.

2. The assembly of claim 1, including a stage and wherein said extraction bar is mounted on said stage for movement towards and away from said received cassette and wherein said stage is mounted for movement laterally of said received cassette.

3. The assembly of claim 1 wherein said wedge mechanism is normally in a recessed position and including means linking said slider to said wedge mechanism so that said movement of said extraction bar laterally of said storage phosphor causes said slider to move said wedge mechanism to an extended position contacting said storage phosphor end cap.

\* \* \* \* \*